United States Patent
Lu et al.

(10) Patent No.: US 11,201,420 B2
(45) Date of Patent: Dec. 14, 2021

(54) PACKAGE PROTECTOR WITH INTEGRATED GUIDE PIN

(71) Applicant: Intel Corporation, Santa Clara, CA (US)

(72) Inventors: Jun Lu, Shanghai (CN); Wei Liao, Shanghai (CN); Guangying Zhang, Shanghai (CN); Liguang Du, Shanghai (CN); Guoliang Ying, Shanghai (CN); Fangbo Zhu, Shanghai (CN); Song Kok Hang, Fremont, CA (US); Juan A. Orozco Ramirez, Zapopan JAL (MX); Wesley B. Morgan, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/976,380

(22) PCT Filed: Jun. 22, 2018

(86) PCT No.: PCT/CN2018/092418
§ 371 (c)(1),
(2) Date: Aug. 27, 2020

(87) PCT Pub. No.: WO2019/242005
PCT Pub. Date: Dec. 26, 2019

(65) Prior Publication Data
US 2021/0143566 A1 May 13, 2021

(51) Int. Cl.
*H01R 12/70* (2011.01)
*G06F 1/18* (2006.01)
*H01R 13/627* (2006.01)

(52) U.S. Cl.
CPC ......... *H01R 12/7005* (2013.01); *G06F 1/185* (2013.01); *H01R 13/6278* (2013.01); *H01R 2201/06* (2013.01)

(58) Field of Classification Search
CPC .. H01R 12/7005; H01R 13/6278; G06F 1/185
(Continued)

(56) References Cited

U.S. PATENT DOCUMENTS 3,895,267 A * 7/1975 Gordon ............... H05K 9/0039
361/728
5,014,160 A * 5/1991 McCoy, Jr. .......... H05K 9/0033
361/818

(Continued)

FOREIGN PATENT DOCUMENTS

| CN | 206650066 U | 11/2017 |
| JP | 1064926 A | 3/1998 |
| JP | 2003078296 A | 3/2003 |

OTHER PUBLICATIONS

International Search Report and Written Opinion dated Mar. 29, 2019 for International Patent Application No. PCT/CN2018/092418, 9 pages.

*Primary Examiner* — Neil Abrams
(74) *Attorney, Agent, or Firm* — Schwabe, Williamson & Wyatt, P.C.

(57) ABSTRACT

Herein described are apparatuses and systems for facilitating alignment of computer component connectors. A package protector may include a body to at least partially surround an integrated circuit package of a circuit card when the package protector is mounted to the circuit card. The package protector may further include a guide pin component that extends from a side of the body, wherein the guide pin component is to be located adjacent to a header of the circuit card when the package protector is mounted to the circuit card, wherein a connector uses the guide pin component to align with the header via a guide pin.

20 Claims, 7 Drawing Sheets

(58) Field of Classification Search
USPC .......................................................... 439/378
See application file for complete search history.

(56) References Cited

U.S. PATENT DOCUMENTS

| | | | |
|---|---|---|---|
| 5,413,489 A | | 5/1995 | Switky |
| 5,508,888 A | * | 4/1996 | Craps .................... H01L 23/562 |
| | | | 174/551 |
| 6,515,871 B1 | * | 2/2003 | Stark ...................... H05K 5/026 |
| | | | 174/365 |
| 6,567,870 B1 | | 5/2003 | Thomas et al. |
| 6,858,801 B1 | * | 2/2005 | Brown ................. H05K 5/0247 |
| | | | 174/560 |
| 7,617,348 B2 | | 11/2009 | Danilak |
| 2010/0007668 A1 | | 1/2010 | Casparian et al. |
| 2014/0185207 A1 | | 7/2014 | Liang |
| 2017/0245367 A1 | | 8/2017 | Gurrola et al. |
| 2021/0143566 A1 | * | 5/2021 | Lu ........................... G06F 1/183 |

\* cited by examiner

PACKAGE PROTECTOR WITH INTEGRATED GUIDE PIN

CROSS REFERENCE TO RELATED APPLICATIONS

The present application is a national phase entry under 35 U.S.C. § 371 of International Application No. PCT/CN2018/092418, filed Jun. 22, 2018, entitled "PACKAGE PROTECTOR WITH INTEGRATED GUIDE PIN", which designated, among the various States, the United States of America. The Specifications of the PCT/CN2018/092418 Application is hereby incorporated by reference.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Capabilities of computer devices are often expanded via mounting of circuit cards to motherboards of the computer devices. Further, there may be additional connections between the circuit cards, and/or between circuit cards and other components within the computer devices. Mounting of the circuit cards to the motherboards and providing the additional connections have presented the challenge of aligning headers and connectors, which may be performed without seeing the connection point in some instances. Legacy approaches to address this challenge involved mounting two independent guide pins and two independent guide pin receptacles to the circuit card and the mating component (the motherboards or other components), respectively or vice versa. Mounting the two guide pins and the two guide pin receptacles involved forming holes in the circuit card and the mating component for the mounting.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
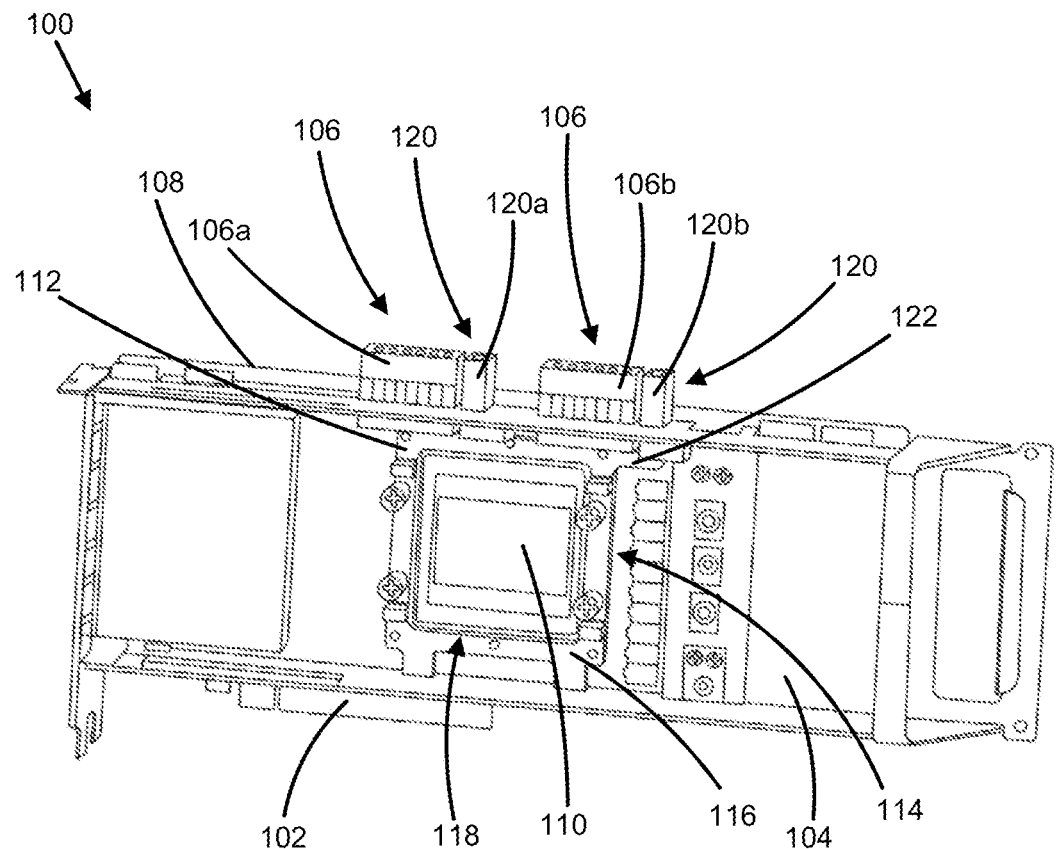
FIG. 1 illustrates an example circuit card, according to various embodiments.

Apparatuses and systems for facilitating alignment of computer component connectors are disclosed herein. A package protector may include a body to at least partially surround an integrated circuit package of a circuit card when the package protector is mounted to the circuit card. The package protector may further include a guide pin component that extends from a side of the body, wherein the guide pin component is to be located adjacent to a header of the circuit card when the package protector is mounted to the circuit card, wherein a connector uses the guide pin component to align with the header via a guide pin.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates an example circuit card 100, according to various embodiments. The circuit card 100 may be coupled to a motherboard of a computer device. In particular, the circuit card 100 may be coupled to the motherboard via edge connector 102. In other embodiments, the edge connector 102 may couple the circuit card 100 to another component of the computer device, such as a backplane and/or a riser card. The circuit card 100 may comprise a daughter card. In some embodiments, the circuit card 100 may comprise a peripheral component interconnect express (PCIe) card. The PCIe card may support the PCIe bus standard, e.g., PCIe bus standard as specified by PCI Express Base Specification Revision 4.0, Version 1.0. Support of the PCIe bus standard may include communication encapsulated in serialized packets, wherein the packetizing and de-packetizing may be handled by a transaction layer of the PCIe card.

The circuit card 100 may include a printed circuit board (PCB) 104 and one or more components coupled to the PCB 104. The PCB 104 may include one or more conductive elements (such as traces, vias, and/or other conductive elements) that provide electrical coupling between the components coupled to the PCB 104.

The circuit card 100 may further include one or more headers 106 coupled to the PCB 104. In the illustrated embodiment, a first header 106a and a second header 106b are shown. The headers 106 may be electrically coupled to one or more other components of the circuit card 100 via the conductive elements of the PCB 104. Each of the headers 106 may receive one or more connectors and may provide electrical coupling with the connectors. In the illustrated embodiment, the headers 106 are shown as extending from the PCB 104 past an edge 108 of the PCB 104 and parallel to a surface of the PCB 104 to which the headers 106 are mounted, where the headers 106 are located at an opposite side of the circuit card 100 from the edge connector 102. In particular, a portion of each of the headers 106 may extend past the edge 108 of the PCB 104 while another portion of each of the headers 106 is located adjacent to the PCB 104. It is to be understood that the headers 106 may extend at different angles to the surface of the PCB 104, may extend past other edges of the PCB 104, and/or may be located within the edges of the PCB 104 in other embodiments. Further, it is to be understood that each of the headers 106 may extend at a different angle to the surface of the PCB 104 and/or may extend past a different edge than one or more of the other headers 106.

The circuit card 100 may further include an integrated circuit (IC) package 110. The IC package 110 may be coupled to the PCB 104. The IC package 110 may comprise a processing unit, such as a graphics processing unit, an input/output (I/O) controller, a digital signal processing unit, a microprocessor, and/or a system on chip (SoC).

The circuit card 100 may further include a package protector 112. The package protector 112 may be coupled to the PCB 104 via fasteners, epoxy, other adhesives, or some combination thereof. The package protector 112 may be formed of a rigid material, such as metal. The package protector 112 may reduce the flexibility of at least a portion of the circuit card 100, where flexing of the circuit card 100 may cause damage to one or more of the components of the circuit card 100, such as the IC package 110.

The package protector 112 may include a body 114. The body 114 may at least partially surround the IC package 110. In the illustrated embodiment, the body 114 may include a frame 116 that surrounds the IC package 110 on four sides of the IC package 110. The body 114 may have an opening 118 formed in the center of the body 114, wherein the frame 116 surrounds the opening 118. The IC package 110 may extend through the opening 118.

The package protector 112 may further include one or more guide pin components 120. The guide pin components 120 may be formed of the same piece of material as the body 114, thereby integrating the guide pin components 120 as part of the package protector 112. Integrating the guide pin components 120 as part of the package protector 112 may reduce manufacturing errors and/or reduce manufacturing time presented by legacy independent guide pins and independent guide pin receptacles. The guide pin components 120 may extend from the body 114. In some embodiments, the body 114 may include one or more extensions (such as extension 122) that extend from the frame 116 to one or more of the guide pin components 120. For example, the guide pin components 120 may extend from one or more sides of the body 114. Each of the guide pin components 120 may extend perpendicular to the sides from which the guide pin components 120 extend. Further, the guide pin components 120 may extend parallel to a surface of the PCB 104 to which the package protector 112 is mounted. In other embodiments, each of the guide pin components 120 may extend at other angles to the sides from which the guide pin components 120 extend.

The guide pin components 120, or some portion thereof, may each be located adjacent to one or more headers 106 of the circuit card 100. For example, a first guide pin component 120a may be located adjacent to the first header 106a and a second guide pin component 120b may be located adjacent to the second header 106b in the illustrated embodiment. The guide pin components 120 may extend past the edge 108 of the PCB 104 adjacent to the headers 106. In particular, a portion of each of the guide pin components 120 may extend past the edge 108 of the PCB 104 adjacent to the portion of the headers 106 that extends past the edge 108. For example, the portion of the first guide pin component 120a may extend past the edge 108 adjacent to the portion of the first header 106a that extends past the edge 108. Further, one or more of the headers 106 may be located between two of the guide pin components 120. For example, the second header 106b may be located between the first guide pin component 120a and the second guide pin component 120b in the illustrated embodiment.

The guide pin components 120 may comprise guide pin receptacles. Each of the guide pin receptacles may have a recess (as is described further in relation to FIG. 2) formed in each of the guide pin receptacles. The guide pin receptacle may receive a guide pin within the recess. Receiving the guide pin receptacle within the recess may facilitate alignment of connectors with the headers 106. For example, the connectors may utilize the guide pin components 120 to align with the headers 106 via the guide pins. In some embodiments, sidewalls of the guide pin receptacles that abut the recesses may be threaded. In these embodiments, the guide pins may comprise screws, where the screws engage with the sidewalls of the guide pin receptacles to maintain the guide pins within the recess. Engagement and disengagement of the screws with the sidewalls of the guide pin receptacles may provide force and linear movement for mating and unmating the connectors with the headers 106, respectively.

In other embodiments, the guide pin components 120 may comprise guide pins. In these embodiments, the guide pins may be received within guide pin receptacles associated with the connectors to be received by the headers 106. In some of these embodiments, the guide pins may comprise screws, where the screws engage with the guide pin receptacles.

Figure 2:
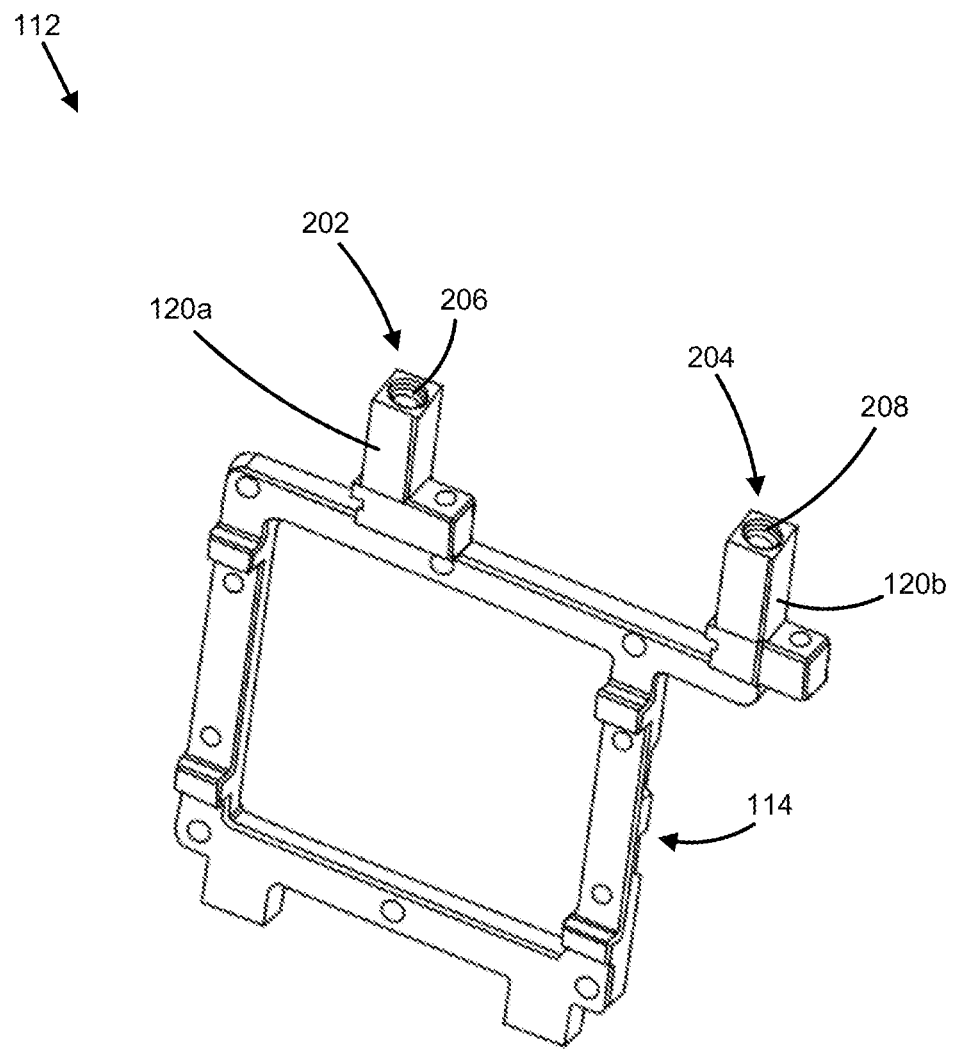
FIG. 2 illustrates the example package protector of FIG. 1, according to various embodiments.

FIG. 2 illustrates the example package protector 112 of FIG. 1, according to various embodiments. The package protector 112 may include may include the body 114 with the first guide pin component 120a and the second guide pin component 120b extending from the body 114. The second guide pin component 120b may extend parallel to the first guide pin component 120a and along a same plane as the first guide pin component 120a.

The first guide pin component 120a may comprise a first guide pin receptacle. The first guide pin receptacle may have a first recess 202. The first recess 202 may receive a first guide pin. Sidewalls 206 of the first guide pin receptacle that abut the first recess 202 may be threaded. The first guide pin may comprise a screw and may engage with the sidewalls 206 of the first guide pin receptacle. Engagement and disengagement of the screw with the sidewalls 206 of the first guide pin receptacle may provide force and linear movement for mating and unmating connectors with headers, respectively.

The second guide pin component 120b may comprise a second guide pin receptacle. The second guide pin receptacle may have a second recess 204. The second recess 204 may receive a second guide pin. Sidewalls 208 of the second guide pin receptacle that abut the second recess 204 may be threaded. The second guide pin may comprise a screw and may engage with the sidewalls 208 of the second guide pin receptacle. Engagement and disengagement of the screw with the sidewalls 208 of the second guide pin receptacle may provide force and linear movement for mating and unmating connectors with headers, respectively.

Figure 3:
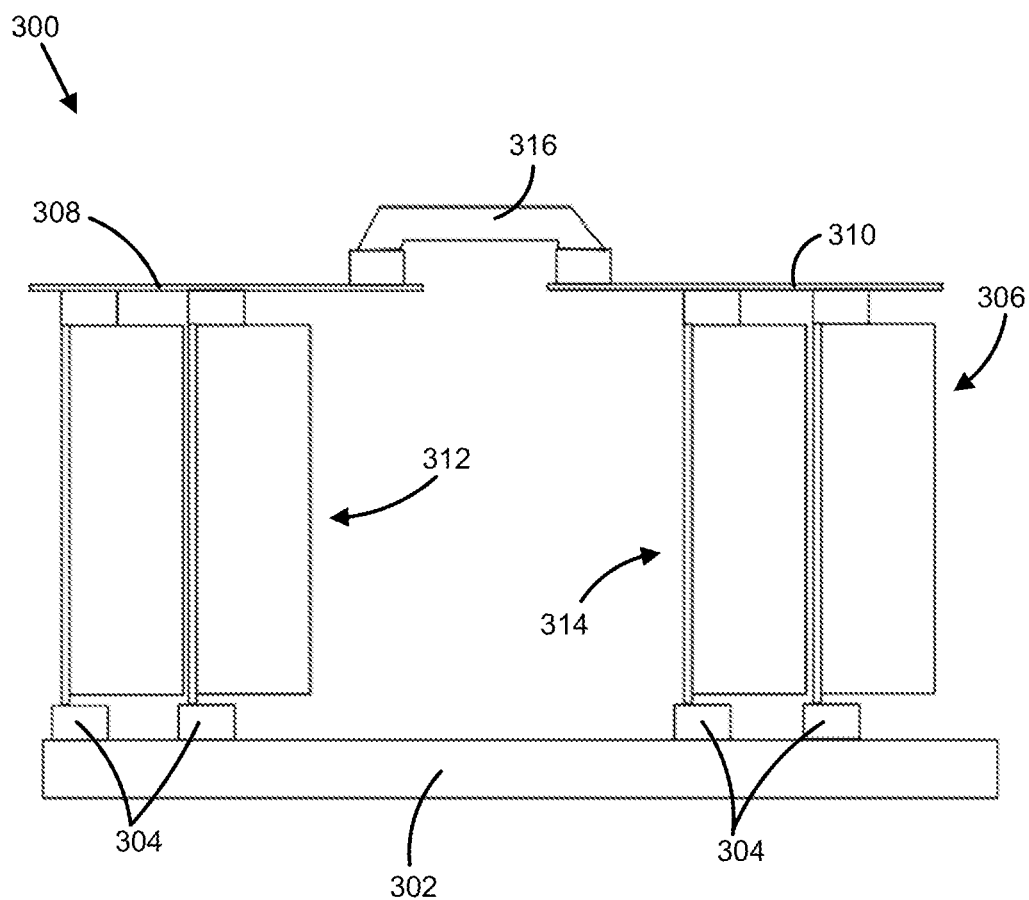
FIG. 3 illustrates an example circuit card arrangement, according to various embodiments.

FIG. 3 illustrates an example circuit card arrangement 300, according to various embodiments. The circuit card arrangement 300 may be implemented within a computer device, such as the computer device 600 (FIG. 6) and/or the computer device 700 (FIG. 7).

The circuit card arrangement 300 may include a PCB 302. The PCB 302 may be a motherboard of the computer device. The PCB 302 may include one or more conductive elements (such as traces, vias, and/or other conductive elements) that provide electrical coupling between the components coupled to the PCB 302. The PCB 302 may include one or more headers 304 coupled to the PCB 302. The conductive elements 302 may electrically couple one or more of the headers 304 and may provide for communication among the headers 304.

The circuit card arrangement 300 may further include one or more circuit cards 306. The circuit cards 306 may include one or more of the features of the circuit card 100 (FIG. 1). The circuit cards 306 may be coupled to the PCB 302 via the headers 304. For example, each of the headers 304 may receive an edge connector (such as the edge connector 102 (FIG. 1)) of a corresponding one of the circuit cards 306. The headers 304 may provide for electrical coupling between the circuit cards 306 and the PCB 302.

The circuit card arrangement 300 may further include a first top plane PCB 308 and a second top plane PCB 310. The first top plane PCB 308 and the second top plane PCB 310 may each include one or more conductive elements (such as traces, vias, and/or other conductive elements) that provide electrical coupling between the components coupled to the PCB 302.

The first top plane PCB 308 and the second top plane PCB 310 may each include one or more connectors. In some embodiments, the connectors may be whisper connectors. The first top plane PCB 308 may be coupled to a first portion 312 of the circuit cards 306 and the second top plane PCB 310 may be coupled to a second portion 314 of the circuit cards 306 via the connectors. For example, the first top plane PCB 308 and the second top plane PCB 310 may include mating guide pin components that mate with guide pin components (such as the guide pin components 120 (FIG. 1)) of the circuit cards 306. The mating guide pin components may comprise guide pins and the guide pin components may comprise guide pin receptacles as described throughout this disclosure. In other embodiments, the mating guide pin components may comprise guide pin receptacles and the guide pin components may comprise guide pins. The connectors of the first top plane PCB 308 and the second top plane PCB 310 may utilize the mating guide pin component and the guide pin component to align each of the connectors with corresponding headers (such as the headers 106 (FIG. 1)) of the circuit cards 306.

The circuit card arrangement 300 may further include one or more cables 316. The cables 316 may be coupled to the first top plane PCB 308 and the second top plane PCB 310 and may allow communication between the first top plane PCB 308 and the second top plane PCB 310 via the cables 316. Accordingly, communication among the circuit cards 306 may be transmitted via the PCB 302 and/or via the first top plane PCB 308, the cables 316, and the second top plane PCB 310. This may allow for higher transfer rates for communication among the circuit cards 306 than if communication among the circuit cards 306 was only available via the PCB 302.

Figure 4:
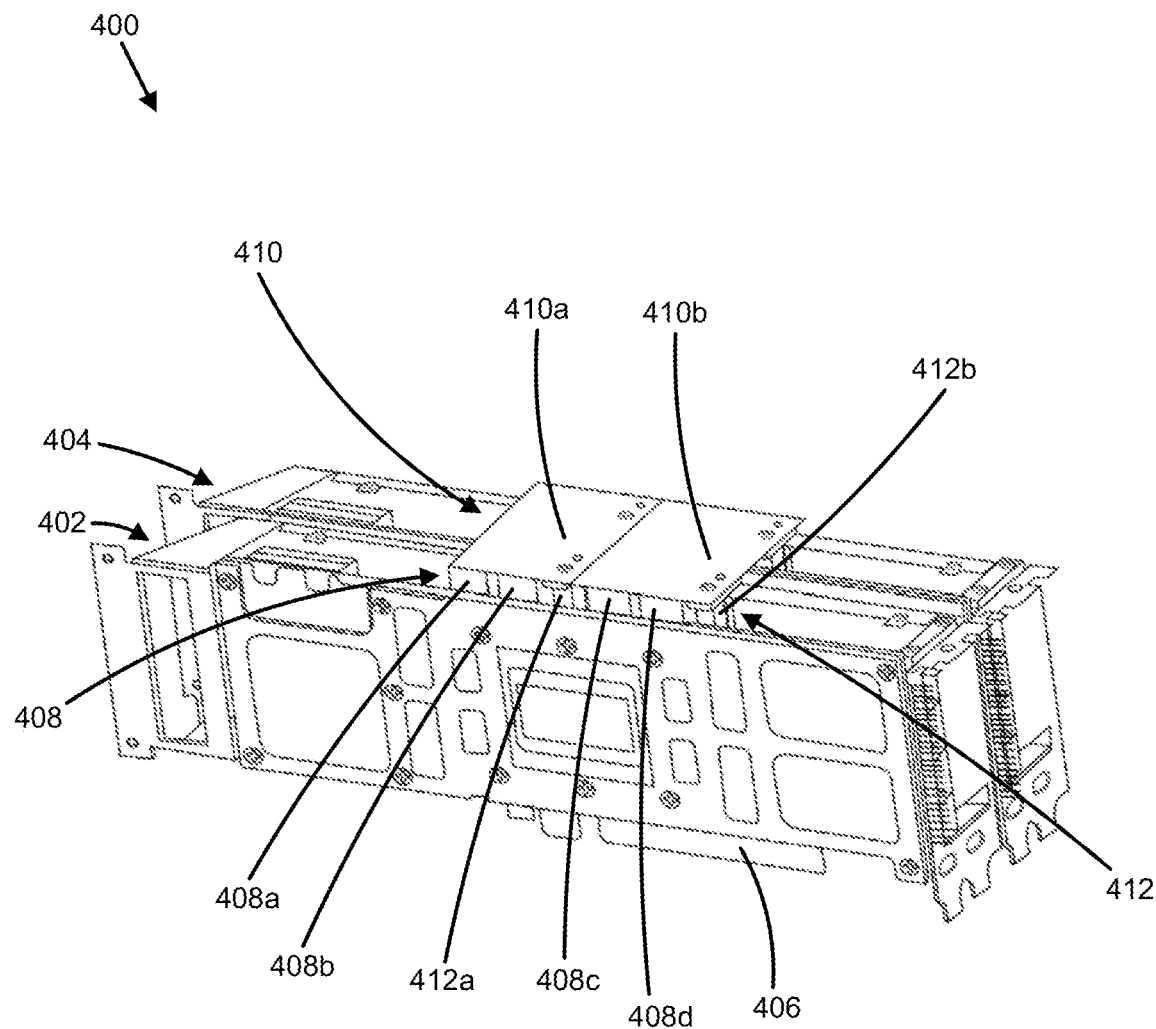
FIG. 4 illustrates another example circuit card arrangement, according to various embodiments.

FIG. 4 illustrates another example circuit card arrangement 400, according to various embodiments. In particular, the circuit card arrangement 400 may illustrate an arrangement of circuit cards that may be coupled to a PCB.

The circuit card arrangement 400 may include a first circuit card 402 and a second circuit card 404. The first circuit card 402 and the second circuit card 404 may each include one or more of the features of the circuit card 100 (FIG. 1). The second circuit card 404 may be located adjacent to the first circuit card 402 and may be aligned with the first circuit card 402. For example, each of the edges of the second circuit card 404 may be aligned along the same planes as corresponding edges of the first circuit card 402. Further, an edge connector 406 of the first circuit card 402 may be aligned along a same plane as an edge connector (obscured due to angle of view) of the second circuit card 404, such that the edge connector 406 and the edge connector of the second circuit card 404 may each mate with corresponding headers coupled to a single, flat PCB.

The first circuit card 402 and the second circuit card 404 may each include one or more headers 408 that couple with one or more connectors of one or more top plane PCBs 410. The top plane PCBs 410 may each include one or more of the features of the first top plane PCB 308 (FIG. 3) and/or the second top plane PCB 310 (FIG. 3). Further, the first circuit card 402 and the second circuit card 404 may each include one or more guide pin components 412 that facilitate alignment of the headers 408 with the connectors of the top plane PCBs 410. The headers 408 may include one or more of the features of the headers 106 (FIG. 1). Further, the guide pin components 412 may include one or more of the features of the guide pin components 120 (FIG. 1). For brevity, the headers 408 and the guide pin components 412 of the first circuit card 402 are described in detail, while details of the headers 408 and the guide pin components 412 of the second circuit card 404 may be omitted from the description. However, it is to be understood that the headers 408 and the guide pin components 412 of the second circuit card 404 include the same features of the headers 408 and the guide pin components 412 of the first circuit card 402 except where otherwise indicated.

The first circuit card 402 may include a first header 408a and a second header 408b that couple to a first connector and a second connector of a first top plane PCB 410a. The first circuit card 402 may further include a first guide pin component 412a that couples to a mating guide pin component of the first top plane PCB 410a. The first guide pin component 412a may be located adjacent to the second header 408b and along a same plane as both the first header 408a and the second header 408b. The first connector and the second connector of the first top plane PCB 410a may utilize the first guide pin component 412a to align with the first header 408a and the second header 408b, respectively. The second circuit card 404 may further be coupled to the first top plane PCB 410a and the first top plane PCB 410a may provide for communication between the first circuit card 402 and the second circuit card 404.

The first circuit card 402 may further include a third header 408c and a fourth header 408d that couple to a first connector and a second connector of a second top plane PCB 410b. The first circuit card 402 may further include a second guide pin component 412b that couples to a mating guide pin component of the second top plane PCB 410b. The second guide pin component 412b may be located adjacent to the fourth header 408d and along a same plane as both the third header 408c and the fourth header 408d. The first connector and the second connector of the second top plane PCB 410b may utilize the second guide pin component 412b to align with the third header 408c and the fourth header 408d, respectively. The second circuit card 404 may further be coupled to the second top plane PCB 410b and the second top plane PCB 410b may provide for communication between the first circuit card 402 and the second circuit card 404.

Figure 5:
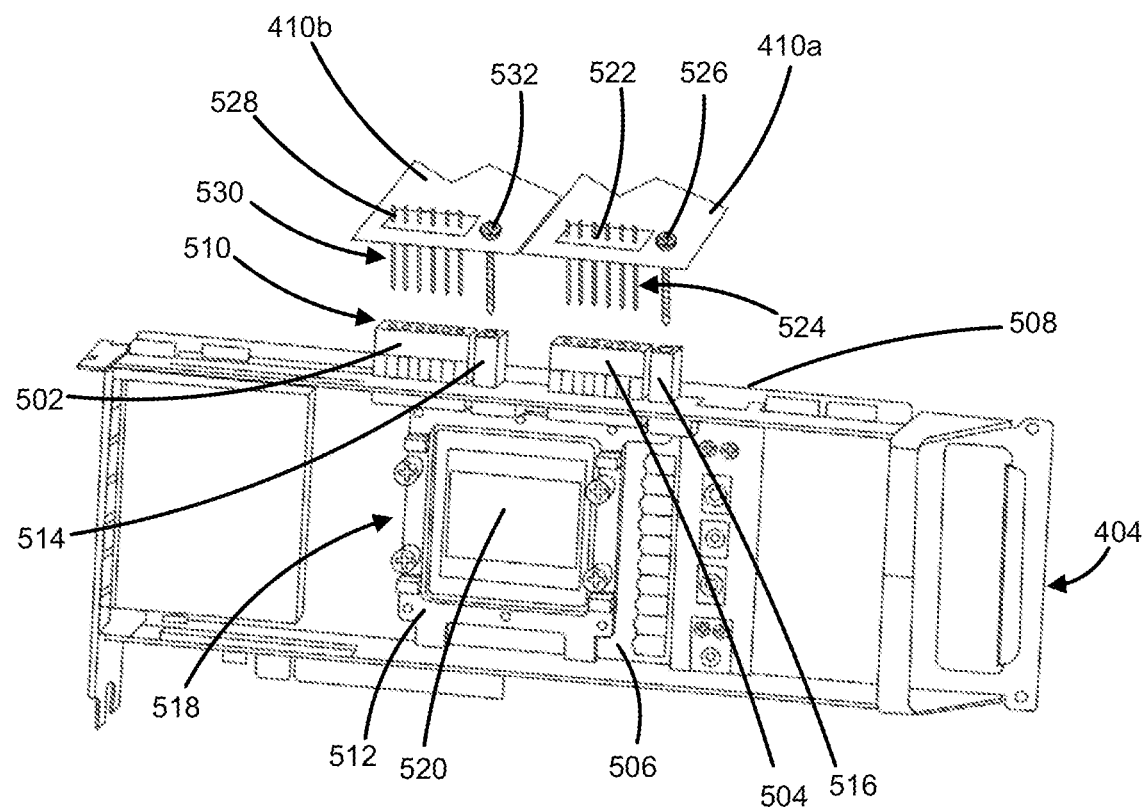
FIG. 5 illustrates another example circuit card arrangement, according to various embodiments.

FIG. 5 illustrates another view of a portion of the example circuit card arrangement 400, according to various embodiments. In particular, FIG. 5 shows the second circuit card 404, the first top plane PCB 410a, and the second top plane PCB 410b. In the illustrated embodiment, the first top plane PCB 410a and the second top plane PCB 410b are illustrated decoupled from the second circuit card 404 to show the alignment of the elements.

The second circuit card 404 may include a first header 502 and a second header 504. The first header 502 and the second header 504 may be coupled to a PCB 506 of the second circuit card 404 and may extend past an edge 508 of the PCB 506. The first header 502 and the second header 504 each may have one or more recesses 510.

The second circuit card 404 may further include a package protector 512. The package protector 512 may include one or more of the features of the package protector 112 (FIG. 1). The package protector 512 may be coupled to the PCB 506. A body 518 of the package protector 512 may at least partially surround a package 520 of the second circuit card 404. For example, the body 518 completely surrounds the package 520 in the illustrated embodiment.

The package protector 512 may include a first guide pin component 514 and a second guide pin component 516. The first guide pin component 514 may extend from the body 518 past the edge 508 of the PCB 506. In particular, the first guide pin component 514 may be located adjacent to the first header 502 and may extend past the edge 508 adjacent to the first header 502. The second guide pin component 516 may extend from the body 518 past the edge 508 of the PCB 506. In particular, the second guide pin component 516 may be located adjacent to the second header 504 and may extend past the edge 508 adjacent to the second header 504.

The first top plane PCB 410a may include a connector 522. The connector 522 may include one or more pins 524. The connector 522 may be mated within the second header 504 by inserting the pins 524 within the recesses 510 of the second header 504. The connector 522 may be electrically coupled with the second header 504 when the connector 522 is mated with the second header 504, thereby allowing communication to be transmitted between the second circuit card 404 and the first top plane PCB 410a.

The first top plane PCB 410a may further include a mating guide pin component 526. The mating guide pin component 526 may be located adjacent to the connector 522. The mating guide pin component 526 may mate with the second guide pin component 516. In the illustrated embodiment, the mating guide pin component 526 comprises a guide pin and the second guide pin component 516 comprises a guide pin receptacle. The guide pin may be received within a recess of the guide pin receptacle to mate the mating guide pin component 526 with the second guide pin component 516. In some embodiments, the guide pin may comprise a screw and the screw may engage with sidewalls abutting the recess of the guide pin receptacle, where the sidewalls are threaded. In other embodiments, the mating guide pin component 526 may comprise a guide pin receptacle and the second guide pin component 516 may comprise a guide pin. Engagement and disengagement of the screw with the sidewalls of the guide pin receptacle may provide force and linear movement for mating and unmating of the connector 522 with the second header 504, respectively.

The connector 522 may utilize the second guide pin component 516 and the mating guide pin component 526 to align the connector 522 with the second header 504. For example, positioning the guide pin within the recess of the guide pin receptacle may cause the connector 522 to be aligned with the second header 504. Aligning the connector 522 with the second header 504 may align the pins 524 of the connector 522 with the recesses 510 of the second header 504, and may reduce or prevent damage being caused to the pins 524 during mating of the connector 522 with the second header 504. A length of the guide pin may be longer than lengths of the pins 524 such that the guide pin engages with the guide pin receptacle before the pins 524 engage with the second header 504 when coupling the first top plane PCB 410a to the second circuit card 404.

The second top plane PCB 410b may include a connector 528. The connector 528 may include one or more pins 530. The connector 528 may be mated within the first header 502 by inserting the pins 530 within the recesses 510 of the first header 502. The connector 528 may be electrically coupled with the first header 502 when the connector 528 is mated with the first header 502, thereby allowing communication to be transmitted between the second circuit card 404 and the second top plane PCB 410b.

The second top plane PCB 410b may further include a mating guide pin component 532. The mating guide pin component 532 may be located adjacent to the connector 528. The mating guide pin component 532 may mate with the first guide pin component 514. In the illustrated embodiment, the mating guide pin component 532 comprises a guide pin and the first guide pin component 514 comprises a guide pin receptacle. The guide pin may be received within a recess of the guide pin receptacle to mate the mating guide pin component 532 with the first guide pin component 514. In some embodiments, the guide pin may comprise a screw and the screw may engage with sidewalls abutting the recess of the guide pin receptacle, where the sidewalls are threaded. In other embodiments, the mating guide pin component 532 may comprise a guide pin receptacle and the first guide pin component 514 may comprise a guide pin. Engagement and disengagement of the screw with the sidewalls of the guide pin receptacle may provide force and linear movement for mating and unmating of the connector 525 with the first header 502, respectively.

The connector 528 may utilize the first guide pin component 514 and the mating guide pin component 532 to align the connector 528 with the first header 502. For example, positioning the guide pin within the recess of the guide pin receptacle may cause the connector 528 to be aligned with the first header 502. Aligning the connector 528 with the first header 502 may align the pins 530 of the connector 528 with the recesses 510 of the first header 502, and may reduce or prevent damage being caused to the pins 530 during mating of the connector 528 with the first header 502. A length of the guide pin may be longer than lengths of the pins 530 such that the guide pin engages with the guide pin receptacle before the pins 530 engage with the first header 502 when coupling the second top plane PCB 410*b* to the second circuit card 404.

Figure 6:
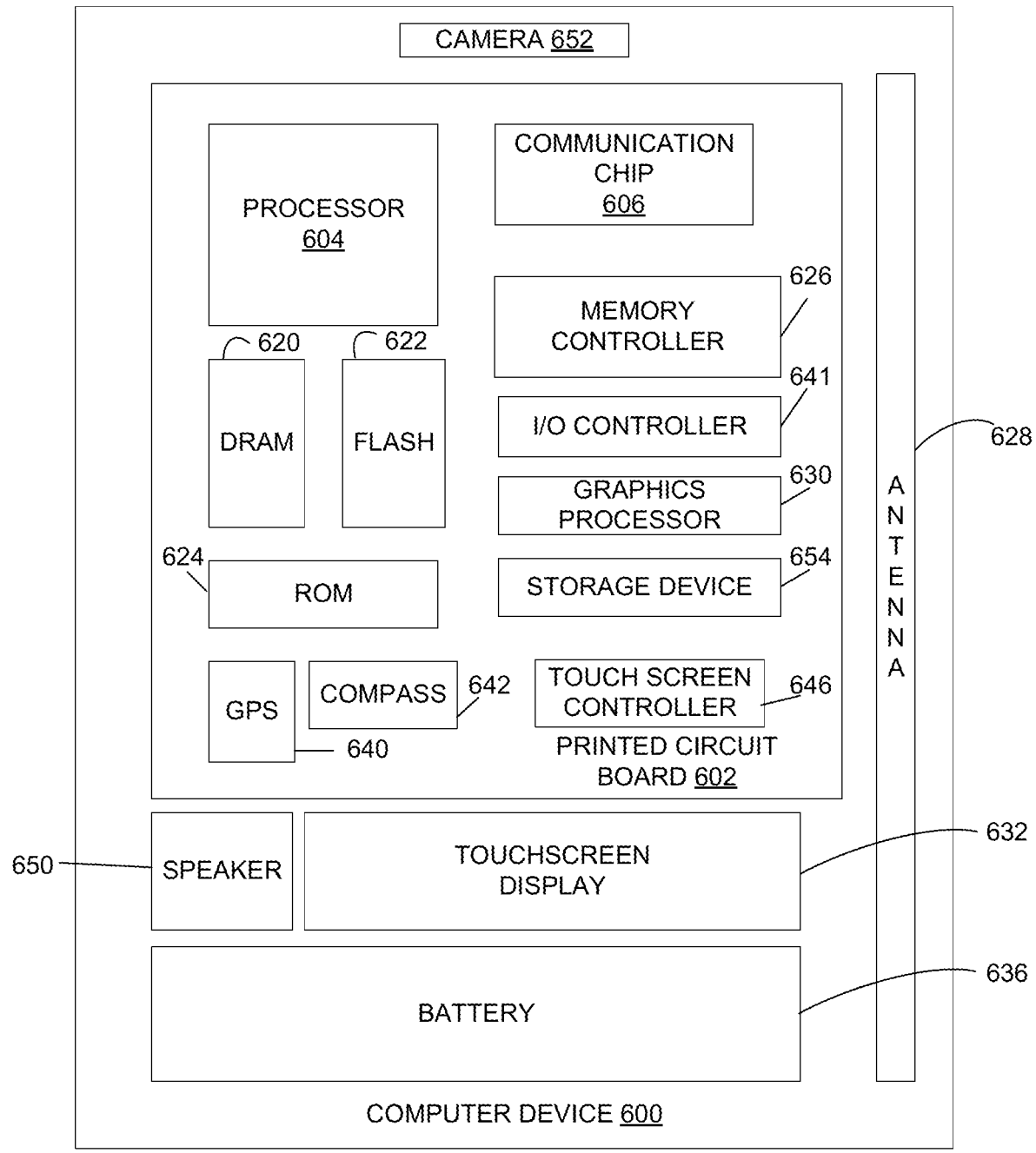
FIG. 6 illustrates an example computer device that may employ the apparatuses and/or methods described herein.
Figure 7:
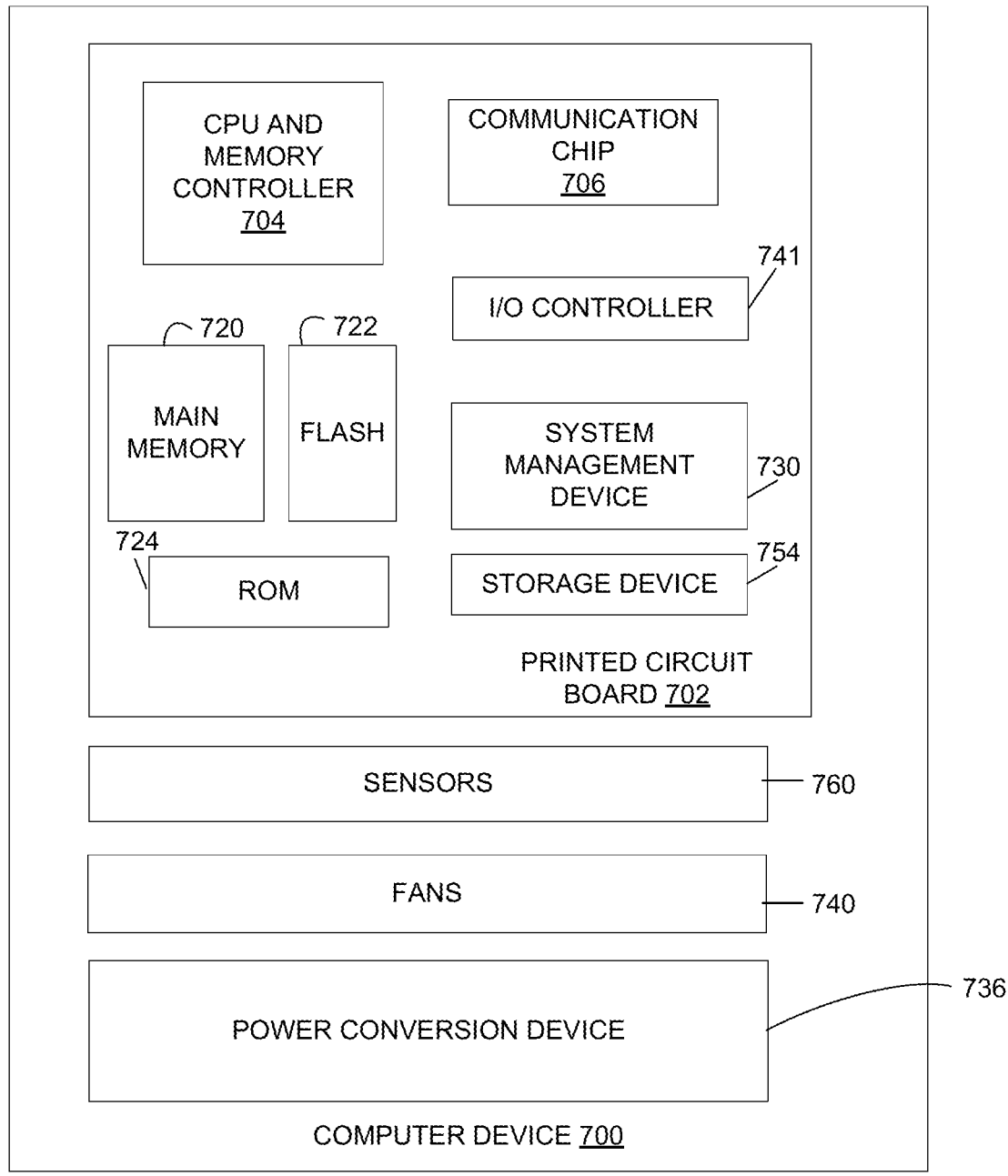
FIG. 7 illustrates another example computer device that may employ the apparatuses and/or methods described herein.

FIG. 6 illustrates an example computer device 600 that may employ the apparatuses and/or methods described herein (e.g., the circuit card 100, the package protector 112, the circuit card arrangement 300, and/or the circuit card arrangement 400), in accordance with various embodiments. As shown, computer device 600 may include a number of components, such as one or more processor(s) 604 (one shown) and at least one communication chip 606. In various embodiments, the one or more processor(s) 604 each may include one or more processor cores. In various embodiments, the at least one communication chip 606 may be physically and electrically coupled to the one or more processor(s) 604. In further implementations, the communication chip 606 may be part of the one or more processor(s) 604. In various embodiments, computer device 600 may include printed circuit board (PCB) 602. For these embodiments, the one or more processor(s) 604 and communication chip 606 may be disposed thereon. In alternate embodiments, the various components may be coupled without the employment of PCB 602.

Depending on its applications, computer device 600 may include other components that may or may not be physically and electrically coupled to the PCB 602. These other components include, but are not limited to, memory controller 626, volatile memory (e.g., dynamic random access memory (DRAM) 620), non-volatile memory such as read only memory (ROM) 624, flash memory 622, storage device 654 (e.g., a hard-disk drive (HDD)), an I/O controller 641, a digital signal processor (not shown), a crypto processor (not shown), a graphics processor 630, one or more antenna 628, a display (not shown), a touch screen display 632, a touch screen controller 646, a battery 636, an audio codec (not shown), a video codec (not shown), a global positioning system (GPS) device 640, a compass 642, an accelerometer (not shown), a gyroscope (not shown), a speaker 650, a camera 652, and a mass storage device (such as hard disk drive, a solid state drive, compact disk (CD), digital versatile disk (DVD)) (not shown), and so forth.

In some embodiments, the one or more processor(s) 604, flash memory 622, and/or storage device 654 may include associated firmware (not shown) storing programming instructions configured to enable computer device 600, in response to execution of the programming instructions by one or more processor(s) 604, to practice all or selected aspects of the methods described herein. In various embodiments, these aspects may additionally or alternatively be implemented using hardware separate from the one or more processor(s) 604, flash memory 622, or storage device 654.

In various embodiments, one or more components of the computer device 600 may include the package protector 112 (FIG. 1) and/or may comprise a circuit card (such as the circuit card 100 (FIG. 1), the circuit cards 306 (FIG. 3), the first circuit card 402 (FIG. 4), and/or the second circuit card 404 (FIG. 4)) coupled to the computer device 600. For example, the graphics processor 630 may be mounted to a circuit card with the package protector 112 encircling the graphics processor 630, where the circuit card is coupled to the PCB 602. The package protector 112 may facilitate alignment of one or more headers/connectors of the circuit card having the graphics processor 630 with the PCB 602 and/or some other component of the computer device 600.

The communication chips 606 may enable wired and/or wireless communications for the transfer of data to and from the computer device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 600 may include a plurality of communication chips 606. For instance, a first communication chip 606 may be dedicated to shorter range wireless communications such as Wi-Fi and Bluetooth, and a second communication chip 606 may be dedicated to longer range wireless communications such as GPS, EDGE, GPRS, CDMA, WiMAX, LTE, Ev-DO, and others.

In various implementations, the computer device 600 may be a laptop, a netbook, a notebook, an ultrabook, a smartphone, a computer tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computer device 600 may be any other electronic device that processes data.

FIG. 7 illustrates another example computer device that may employ the apparatuses and/or methods (e.g., the circuit card 100, the package protector 112, the circuit card arrangement 300, and/or the circuit card arrangement 400) described herein. As shown, computer device 700 may include a number of components, such as one or more processor and memory controller device(s) 704 (one shown) and at least one communication chip 706. In various embodiments, the one or more processor and memory controller device(s) 704 each may include one or more processor cores. In various embodiments, the at least one communication chip 706 may be physically and electrically coupled to the one or more processor and memory controller device(s) 704. In further implementations, the communication chip 706 may be part of the one or more processor and memory controller device(s) 704. In some embodiments, the processor and memory controller device(s) 704 may include one or more neural network processors.

Further, in various embodiments, a system management device 730 (such as baseboard management controller (BMC)) may be coupled to the one or more processor and memory controller device(s) 704. The system management device 730 may monitor the state of the computer device 700 via one or more sensors 760. The one or more sensors 760 may sense the physical state of the computer device 700, such as a temperature of the computer device 700. In some embodiments, the system management device 730 may communicate with the one or more processor and memory controller device(s) 704 through an independent connection. Further, in some embodiments, the system management device 730 and/or the sensors 760 may be omitted.

In various embodiments, computer device 700 may include printed circuit board (PCB) 702. For these embodiments, the one or more processor and memory controller device(s) 704 and communication chip 706 may be disposed thereon. In alternate embodiments, the various components may be coupled without the employment of PCB 702. Depending on its applications, computer device 700 may include other components that may or may not be physically and electrically coupled to the PCB 702. These other components include, but are not limited to, main memory (e.g., volatile memory, non-volatile memory, and/or dynamic random access memory (DRAM)) 720, read-only memory (ROM) 724, flash memory 722, storage device 754 (e.g., a hard-disk drive (HDD)), an I/O controller 741, a digital signal processor (not shown), a crypto processor (not shown), a system management device 730, a display (not shown), a power conversion device 736, an audio codec (not shown), a video codec (not shown), and a mass storage device (such as hard disk drive, a solid state drive, compact disk (CD), digital versatile disk (DVD)) (not shown), and so forth.

In various embodiments, the computer device 700 may include one or more fans 740. The one or more fans 740 may be directed at and/or mounted to one or more of the components within the computer device 700. In some embodiments, the one or more fans 740 may be coupled to the one or more processor and memory controller device(s) 704 and/or the system management device 730, which may control operation of the one or more fans 740.

In some embodiments, the one or more processor and memory controller device(s) 704, flash memory 722, and/or storage device 754 may include associated firmware (not shown) storing programming instructions configured to enable computer device 700, in response to execution of the programming instructions by one or more processor and memory controller device(s) 704, to implement an operating system and/or one or more applications. In various embodiments, these aspects may additionally or alternatively be implemented using hardware separate from the one or more processor and memory controller device(s) 704, flash memory 722, or storage device 754.

In various embodiments, one or more components of the computer device 700 may include the package protector 112 (FIG. 1) and/or may comprise a circuit card (such as the circuit card 100 (FIG. 1), the circuit cards 306 (FIG. 3), the first circuit card 402 (FIG. 4), and/or the second circuit card 404 (FIG. 4)) coupled to the computer device 700. For example, the processor and memory controller devices 704 may be mounted to a circuit card with the package protector 112 encircling the processor and/or memory controller device, where the circuit card is coupled to the PCB 702. The package protector 112 may facilitate alignment of one or more headers/connectors of the circuit card having the processor and memory controller devices 704 with the PCB 702 and/or some other component of the computer device 700.

The communication chips 706 may enable wired and/or wireless communications for the transfer of data to and from the computer device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 700 may include a plurality of communication chips 706. For instance, a first communication chip 706 may be dedicated to shorter range wireless communications such as Wi-Fi and Bluetooth, and a second communication chip 706 may be dedicated to longer range wireless communications such as GPS, EDGE, GPRS, CDMA, WiMAX, LTE, Ev-DO, and others.

In various implementations, the computer device 700 may be a server. In other implementations, the computer device 700 may be, or components of the computer device 700 may be implemented in, a laptop, a netbook, a notebook, an ultrabook, a smartphone, a computer tablet, a personal digital assistant (PDA), an ultra-mobile PC, a mobile phone, a desktop computer, a printer, a scanner, a monitor, a set-top box, an entertainment control unit (e.g., a gaming console or automotive entertainment unit), a digital camera, an appliance, a portable music player, or a digital video recorder. In further implementations, the computer device 700 may be any other electronic device that processes data.

Example 1 may include a package protector, comprising a body to at least partially surround an integrated circuit package of a circuit card when the package protector is mounted to the circuit card, and a guide pin component that extends from a side of the body, wherein the guide pin component is to be located adjacent to a header of the circuit card when the package protector is mounted to the circuit card, wherein a connector uses the guide pin component to align with the header via a guide pin.

Example 2 may include the package protector of example 1, wherein the guide pin component comprises a guide pin receptacle, and the guide pin receptacle is to receive the guide pin within a recess of the guide pin receptacle.

Example 3 may include the package protector of example 2, wherein sidewalk of the guide pin receptacle that abut the recess are threaded, and wherein the guide pin comprises a screw to engage with the sidewalls of the guide pin receptacle.

Example 4 may include the package protector of any of examples 1-3, wherein the guide pin component extends perpendicular from the side of the body.

Example 5 may include the package protector of any of examples 1-3, wherein a portion the guide pin component extends past an edge of the circuit card, and wherein the portion of the guide pin component has a recess that is to receive the guide pin.

Example 6 may include the package protector of any of examples 1-3, wherein the body has an opening formed in a center of the body, wherein the body includes a frame that surrounds the opening, and wherein the integrated circuit package is to extend through the opening when the package protector is mounted to the circuit card.

Example 7 may include the package protector of any of examples 1-3, wherein the guide pin component is a first guide pin component, the guide pin is a first guide pin, the header is a first header, and the connector is a first connector, wherein the package protector further comprises a second guide pin component that extends from the side of the body, and wherein the guide pin component is to be located adjacent to a second header of the circuit card, and wherein a second connector uses the second guide pin component to align with the second header via a second guide pin.

Example 8 may include a circuit card, comprising a printed circuit board (PCB), an integrated circuit package mounted to the PCB, a header mounted to the PCB, and a package protector mounted to the PCB, wherein the package protector includes a frame that surrounds the integrated circuit package, and a guide pin component that is located adjacent to the header, wherein a connector uses the guide pin component to align with the header via a guide pin.

Example 9 may include the circuit card of example 8, wherein a portion of the header extends past an edge of the PCB, and wherein a portion of the guide pin component extends past the edge of the PCB, the portion of the guide pin component located adjacent to the portion of the header.

Example 10 may include the circuit card of example 8 or example 9, wherein the guide pin component comprises a guide pin receptacle, wherein the guide pin receptacle is to receive the guide pin within a recess of the guide pin receptacle.

Example 11 may include the circuit card of example 10, wherein sidewalls of the guide pin receptacle that abut the recess are threaded, and wherein the guide pin comprises a screw to engage with the sidewalls of the guide pin receptacle.

Example 12 may include the circuit card of example 8 or example 9, wherein the guide pin component extends perpendicular from a side of the frame and parallel to a surface of the PCB to which the package protector is mounted.

Example 13 may include the circuit card of example 8 or example 9, wherein the guide pin component is a first guide pin component and the guide pin is a first guide pin, wherein the package further includes a second guide pin component that extends parallel to the first guide pin component and along a same plane as the first guide pin component, and wherein the connector further uses the second guide pin component to align with the header via a second guide pin.

Example 14 may include the circuit card of example 13, wherein the first guide pin component and the second guide pin component extend parallel to a surface of the PCB to which the package protector is mounted.

Example 15 may include the circuit card of example 14, wherein the header is located between the first guide pin component and the second guide pin component.

Example 16 may include a computer device, comprising a printed circuit board (PCB), a circuit card mounted to the PCB, wherein the circuit card includes a header, and a package protector that includes a frame that surrounds an integrated circuit package of the circuit card, and a guide pin component that is located adjacent to the header, and a coupling board mounted to the circuit card, wherein the coupling board includes a first connector that is coupled to the header of the circuit card, a mating guide pin component that mates with the guide pin component of the circuit card, wherein the first connector uses the mating guide pin component and the guide pin component to align the first connector with the header, and a second connector that is coupled to a component of the computer device and electrically couples a portion of the circuit card to a portion of the component via the coupling board.

Example 17 may include the computer device of example 16, wherein the guide pin component comprises a guide pin receptacle with a recess, and wherein the mating guide pin component comprises a guide pin that is located within the recess.

Example 18 may include the computer device of example 17, wherein sidewalls of the guide pin receptacle that abut the recess are threaded, wherein the guide pin comprises a screw that engages with the sidewalls of the guide pin receptacle and retains mating of the header and the first connector.

Example 19 may include the computer device of any of examples 16-18, wherein the coupling board is mounted to the circuit card at an opposite side of the circuit card from the PCB.

Example 20 may include the computer device of any of examples 16-18, wherein the circuit card is a first circuit card, wherein the computer device further comprises a second circuit card mounted to the PCB, and wherein the component of the computer device is the second circuit card.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. A package protector, comprising:
a body to at least partially surround an integrated circuit package of a circuit card when the package protector is mounted to the circuit card; and
a guide pin component that extends from a side of the body, wherein the guide pin component is to be located adjacent to a header of the circuit card when the package protector is mounted to the circuit card, wherein a connector uses the guide pin component to align with the header via a guide pin.

2. The package protector of claim 1, wherein the guide pin component comprises a guide pin receptacle, and the guide pin receptacle is to receive the guide pin within a recess of the guide pin receptacle.

3. The package protector of claim 2, wherein sidewalls of the guide pin receptacle that abut the recess are threaded, and wherein the guide pin comprises a screw to engage with the sidewalls of the guide pin receptacle.

4. The package protector of claim 1, wherein the guide pin component extends perpendicular from the side of the body.

5. The package protector of claim 1, wherein a portion of the guide pin component extends past an edge of the circuit card, and wherein the portion of the guide pin component has a recess that is to receive the guide pin.

6. The package protector of claim 1, wherein the body has an opening formed in a center of the body, wherein the body includes a frame that surrounds the opening, and wherein the integrated circuit package is to extend through the opening when the package protector is mounted to the circuit card.

7. The package protector of claim 1, wherein the guide pin component is a first guide pin component, the guide pin is a first guide pin, the header is a first header, and the connector is a first connector, wherein the package protector further comprises a second guide pin component that extends from the side of the body, and wherein the guide pin component is to be located adjacent to a second header of the circuit card, and wherein a second connector uses the second guide pin component to align with the second header via a second guide pin.

8. A circuit card, comprising:
a printed circuit board (PCB);
an integrated circuit package mounted to the PCB;
a header mounted to the PCB; and
a package protector mounted to the PCB, wherein the package protector includes:
   a frame that surrounds the integrated circuit package; and
   a guide pin component that is located adjacent to the header, wherein a connector uses the guide pin component to align with the header via a guide pin.

9. The circuit card of claim 8, wherein a portion of the header extends past an edge of the PCB, and wherein a portion of the guide pin component extends past the edge of the PCB, the portion of the guide pin component located adjacent to the portion of the header.

10. The circuit card of claim 8, wherein the guide pin component comprises a guide pin receptacle, wherein the guide pin receptacle is to receive the guide pin within a recess of the guide pin receptacle.

11. The circuit card of claim 10, wherein sidewalls of the guide pin receptacle that abut the recess are threaded, and wherein the guide pin comprises a screw to engage with the sidewalls of the guide pin receptacle.

12. The circuit card of claim 8, wherein the guide pin component extends perpendicular from a side of the frame and parallel to a surface of the PCB to which the package protector is mounted.

13. The circuit card of claim 8, wherein the guide pin component is a first guide pin component and the guide pin is a first guide pin, wherein the package further includes a second guide pin component that extends parallel to the first guide pin component and along a same plane as the first guide pin component, and wherein the connector further uses the second guide pin component to align with the header via a second guide pin.

14. The circuit card of claim 13, wherein the first guide pin component and the second guide pin component extend parallel to a surface of the PCB to which the package protector is mounted.

15. The circuit card of claim 14, wherein the header is located between the first guide pin component and the second guide pin component.

16. A computer device, comprising:
a printed circuit board (PCB);
a circuit card mounted to the PCB, wherein the circuit card includes:
   a header; and
   a package protector that includes:
      a frame that surrounds an integrated circuit package of the circuit card; and
      a guide pin component that is located adjacent to the header; and
a coupling board mounted to the circuit card, wherein the coupling board includes:
   a first connector that is coupled to the header of the circuit card;
   a mating guide pin component that mates with the guide pin component of the circuit card, wherein the first connector uses the mating guide pin component and the guide pin component to align the first connector with the header; and
   a second connector that is coupled to a component of the computer device and electrically couples a portion of the circuit card to a portion of the component via the coupling board.

17. The computer device of claim 16, wherein the guide pin component comprises a guide pin receptacle with a recess, and wherein the mating guide pin component comprises a guide pin that is located within the recess.

18. The computer device of claim 17, wherein sidewalls of the guide pin receptacle that abut the recess are threaded, wherein the guide pin comprises a screw that engages with the sidewalls of the guide pin receptacle and retains mating of the header and the first connector.

19. The computer device of claim 16, wherein the coupling board is mounted to the circuit card at an opposite side of the circuit card from the PCB.

20. The computer device of claim 16, wherein the circuit card is a first circuit card, wherein the computer device further comprises a second circuit card mounted to the PCB, and wherein the component of the computer device is the second circuit card.

* * * * *